United States Patent
Park et al.

(10) Patent No.: US 11,871,287 B2
(45) Date of Patent: Jan. 9, 2024

(54) METHOD AND APPARATUS FOR HANDOVER IN WIRELESS COMMUNICATION SYSTEM

(71) Applicant: ELECTRONICS AND TELECOMMUNICATIONS RESEARCH INSTITUTE, Daejeon (KR)

(72) Inventors: Hyun Seo Park, Daejeon (KR); Yun Joo Kim, Daejeon (KR); Eunkyung Kim, Daejeon (KR); Tae Joong Kim, Daejeon (KR); An Seok Lee, Daejeon (KR); Yu Ro Lee, Daejeon (KR); Heesoo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 186 days.

(21) Appl. No.: 17/384,703

(22) Filed: Jul. 23, 2021

(65) Prior Publication Data
US 2022/0030476 A1 Jan. 27, 2022

(30) Foreign Application Priority Data

Jul. 24, 2020 (KR) .......................... 10-2020-0092137
Jul. 22, 2021 (KR) .......................... 10-2021-0096512

(51) Int. Cl.
*H04W 36/00* (2009.01)
*H04W 36/08* (2009.01)

(52) U.S. Cl.
CPC ....... *H04W 36/0058* (2018.08); *H04W 36/08* (2013.01)

(58) Field of Classification Search
CPC ............ H04W 36/0058; H04W 36/08; H04W 36/0069; H04W 36/00835
See application file for complete search history.

(56) References Cited

U.S. PATENT DOCUMENTS

| 9,936,427 | B2 | 4/2018 | Sivanesan et al. |
| 10,484,922 | B2 | 11/2019 | Kim |

(Continued)

FOREIGN PATENT DOCUMENTS

| EP | 3282769 A2 * | 2/2018 | ............. H04L 67/12 |
| NO | 2020197277 A1 | 10/2020 | |

(Continued)

OTHER PUBLICATIONS

ETSI TS 138 331 V16.1.0 (5G; NR; RRC; Protocol specification (3GPP TS 38.331 version 16.1.0 Release 16, Jul. 3, 2020) (Year: 2020).*

(Continued)

*Primary Examiner* — Chi H Pham
*Assistant Examiner* — Ji-Hae Yea
(74) *Attorney, Agent, or Firm* — Rabin & Berdo, P.C.

(57) ABSTRACT

A handover method of a first terminal in a wireless communication system may comprise: transmitting a first measurement report message to a first cell that is a primary cell (PCell); receiving, from the first cell, one or more first configuration messages for one or more target cells determined according to the first measurement report message; adding each of the one or more target cells as a candidate PCell based on the one or more first configuration messages; and performing data transmission and reception with at least one cell among the first cell and the one or more candidate PCells.

17 Claims, 13 Drawing Sheets

(56) References Cited

U.S. PATENT DOCUMENTS

2019/0335372 A1   10/2019  Dai et al.
2019/0349822 A1*  11/2019  Kim .................. H04W 36/0069
2020/0154321 A1    5/2020  Kang et al.
2020/0336960 A1   10/2020  Park et al.
2022/0007243 A1*   1/2022  Da Silva ............... H04W 48/06

FOREIGN PATENT DOCUMENTS

WO      2016117732 A1    7/2016
WO      2020037503 A1    2/2020

OTHER PUBLICATIONS

Ingo Viering et al., "Zero-Zero Mobility: Intra-Frequency Handovers with Zero Interruption and Zero Failures", IEEE Network, vol. 32, No. 2, Mar./Apr. 2018, pp. 48-54.

* cited by examiner protocol layers for source cell protocol layers for source cell protocol layers for target cell protocol layers for target cell

METHOD AND APPARATUS FOR HANDOVER IN WIRELESS COMMUNICATION SYSTEM

CROSS-REFERENCE TO RELATED APPLICATIONS

This application claims priority to Korean Patent Applications No. 10-2020-0092137 filed on Jul. 24, 2020 and No. 10-2021-0096512 filed on Jul. 22, 2021 with the Korean Intellectual Property Office (KIPO), the entire contents of which are hereby incorporated by reference.

BACKGROUND

1. Technical Field

The present disclosure relates to a method and an apparatus for handover in a wireless communication system, and more specifically, to a method and an apparatus for handover, which can prevent data interruption in a handover procedure by maintaining connections with both a source cell and a target cell while performing a handover operation.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

In a communication system, a terminal may change a cell (e.g., base station) to which the terminal is connected through a handover procedure or a cell (re)selection procedure. In the handover procedure, the terminal may measure a strength of a signal received from a neighbor cell, and may report a measurement result to a source cell or a serving cell. The source cell may receive the measurement result from the terminal, and may select a target cell to which the terminal is to be handed over based on the measurement result. That is, the target cell to which the terminal is to perform handover may be selected by the source cell. When a handover preparation is completed in the target cell selected by the source cell, the source cell may transmit a handover (HO) command message indicating a handover to the target cell to the terminal. When the HO command message is received from the source cell, the terminal may perform an access procedure with the target cell.

In an exemplary embodiment of the communication system, the terminal may release the connection with the source cell to perform the handover, and connect to the target cell. In the process where the terminal releases the connection with the source cell and connects to the target cell, an interruption time may occur during which the terminal cannot normally receive data. In order to reduce the interruption time in such the break-before-make handover, a dual active protocol stack (DAPS) handover scheme in which the terminal maintains the connection with the source cell during the handover process and release the connection with the source cell after completing the handover to the target cell has been proposed. According to the DAPS handover scheme, in theory, the interruption time in the handover process may become 0 ms. However, in the DAPS handover scheme, in order to simultaneously receive and process data from the source cell and the target cell, layers such as radio link control (RLC)/media access control (MAC)/physical (PHY) layers should operate for each of the source cell and the target cell, and there may be a problem in that the complexity of the terminal and/or the complexity of the handover operation increases.

Matters described as the prior arts are prepared to promote understanding of the background of the present disclosure, and may include matters that are not already known to those of ordinary skill in the technology domain to which exemplary embodiments of the present disclosure belong.

SUMMARY

In order to solve the above-identified problems, exemplary embodiments of the present disclosure are directed to providing a method and an apparatus for handover in a wireless communication system, which can prevent a problem of interruption time in a handover procedure, and can reduce the complexity of the terminal and the handover operations.

According to an exemplary embodiment of the present disclosure for achieving the above-described objective, a handover method of a first terminal in a wireless communication system may comprise: transmitting a first measurement report message to a first cell that is a primary cell (PCell); receiving, from the first cell, one or more first configuration messages for one or more target cells determined according to the first measurement report message; adding each of the one or more target cells as a candidate PCell based on the one or more first configuration messages; and performing data transmission and reception with at least one cell among the first cell and the one or more candidate PCells.

The handover method may further comprise, after the adding of each of the one or more target cells, switching the first cell to a candidate PCell, and changing a PCell of the first terminal from the first cell to a second cell determined as a handover target among the one or more candidate PCells.

The changing of the PCell from to the first cell to the second cell may comprise: monitoring whether a handover execution event condition is satisfied for the one or more candidate PCells; when the second cell satisfying the handover execution event condition is detected among the one or more candidate PCells, transmitting a second measurement report message including measurement information on the detected second cell to the first cell; and when a second configuration message generated according to the second measurement report message is received from the first cell, switching the first cell to a candidate PCell and changing the PCell of the first terminal from the first cell to the second cell.

The handover method may further comprise, after the adding of each of the one or more target cells, receiving, from the first cell, an additional configuration message indicating information instructing to change candidate PCell-related configuration; and changing the candidate PCell-related configuration based on the additional configuration message, wherein the additional configuration message corresponds to one of a third configuration message instructing to release at least part of the one or more candidate PCells, a fourth configuration message instructing the first terminal to add a new cell other than the one or more candidate PCells as a candidate PCell, a fifth configuration message instructing to modify information registered with respect to one cell among the one or more candidate PCells, and a sixth configuration message instructing to change one cell among the one or more candidate PCells to a new cell other than the one or more candidate PCells.

The one or more first configuration messages may include at least part of radio resource configuration information for performing connection and/or data transmission/reception with the one or more target cells, configuration information for performing synchronization and/or random access (RA) for the one or more target cells, and configuration information for performing signal strength measurement for the one or more target cells.

The handover method may further comprise, after the adding of each of the one or more target cells, performing an RA procedure for the one or more candidate PCells; and acquiring synchronization with the one or more candidate PCells based on the RA procedure, wherein a time of performing the RA procedure is indicated by the first cell or determined by the first terminal.

The performing of the data transmission and reception may comprise: performing data transmission and reception with the first cell; receiving, from the first cell, a seventh configuration message instructing to change a data transmission and reception point to a seventh cell among the one or more candidate PCells; and performing data transmission and reception with the seventh cell.

The handover method may further comprise, after the changing of the PCell of the first terminal, transmitting, to the second cell, a downlink reception status message including information on a reception status of downlink data received from the first cell before the changing of the PCell of the first terminal; and receiving, from the second cell, lost downlink data recovered based on the downlink reception status message.

The handover method may further comprise, after the changing of the PCell of the first terminal, receiving, from the second cell, an uplink reception status message including information on a reception status of uplink data transmitted to the first cell before the changing of the PCell of the first terminal; identifying whether there is lost uplink data based on the uplink reception status message; and when there is the lost uplink data, recovering the lost uplink data and transmitting the recovered uplink data to the second cell.

According to another exemplary embodiment of the present disclosure for achieving the above-described objective, a handover control method of a first cell in a wireless communication system may comprise: receiving a first measurement report message from a first terminal connected to the first cell; transmitting a handover preparation request message to each of one or more target cells identified based on the first measurement report message; receiving a handover preparation acknowledgment message that is a response to the handover preparation request message from at least part of the one or more target cells; and transmitting, to the first terminal, one or more first configuration messages instructing to add each of one or more target cells transmitting the handover preparation acknowledgment message as a candidate primary cell (PCell).

The handover control method may further comprise, after the transmitting of the one or more first configuration messages, transmitting, to the first terminal, a second configuration message instructing to change a PCell of the first terminal from the first cell to a second cell determined as a handover target among the one or more candidate PCells.

The transmitting of the second configuration message may comprise: receiving, from the first terminal, a second measurement report message including measurement information on the second cell satisfying a predetermined handover execution event condition among the one or more candidate PCells added based on the one or more first configuration messages; transmitting a handover execution request message to the second cell based on the second measurement report message; receiving a handover execution acknowledgement message as a response to the handover execution request message from the second cell; and transmitting, to the first terminal, a second configuration message instructing to change the PCell of the first terminal from the first cell to the second cell.

The handover control method may further comprise, after the transmitting of the one or more first configuration messages, transmitting, to the first terminal, an additional configuration message indicating information instructing to change candidate PCell-related configuration, wherein the additional configuration message corresponds to one of a third configuration message instructing to release at least part of the one or more candidate PCells, a fourth configuration message instructing the first terminal to add a new cell other than the one or more candidate PCells as a candidate PCell, a fifth configuration message instructing to modify information registered with respect to one cell among the one or more candidate PCells, and a sixth configuration message instructing to change one cell among the one or more candidate PCells to a new cell other than the one or more candidate PCells.

The one or more first configuration messages may include at least part of radio resource configuration information for the first terminal to perform connection and/or data transmission/reception with the one or more target cells, configuration information for the first terminal to perform synchronization and/or random access (RA) for the one or more target cells, and configuration information for the first terminal to perform signal strength measurement for the one or more target cells.

The handover control method may further comprise, after the transmitting of the one or more first configuration messages, performing data transmission and reception with the first terminal; transmitting, to the first terminal, a seventh configuration message instructing to change a data transmission and reception point to a seventh cell among the added one or more candidate PCells; and transmitting, to the seventh cell, an eighth configuration message indicating that the data transmission and reception point of the first terminal is changed from the first cell to the seventh cell.

The handover control method may further comprise, after the transmitting of the second configuration message, receiving, from the second cell, a downlink reception status message including information on a reception status of downlink data transmitted to the first terminal before the transmitting of the second configuration message; identifying whether there is lost downlink data based on the downlink reception status message; and when there is the lost downlink data, recovering the lost downlink data and transmitting the recovered downlink data to the second cell.

The handover control method may further comprise, after the transmitting of the second configuration message, transmitting, to the second cell, an uplink reception status message including information on a reception status of uplink data received by the first cell from the first terminal before the transmitting of the second configuration message.

According to yet another exemplary embodiment of the present disclosure for achieving the above-described objective, a first terminal performing inter-cell handover in a wireless communication system may comprise a processor; a memory electronically communicating with the processor;

and instructions stored in the memory, wherein when executed by the processor, the instructions cause the first terminal to: transmit a first measurement report message to a first cell that is a primary cell (PCell); receive, from the first cell, one or more first configuration messages for one or more target cells determined according to the first measurement report message; add each of the one or more target cells as a candidate PCell based on the one or more first configuration messages; perform data transmission and reception with at least one cell among the first cell and the one or more candidate PCells; and switch the first cell to a candidate PCell, and change a PCell of the first terminal from the first cell to a second cell determined as a handover target among the one or more candidate PCells.

The instructions may further cause the first terminal to: monitor whether a handover execution event condition is satisfied for the one or more candidate PCells; when the second cell satisfying the handover execution event condition is detected among the one or more candidate PCells, transmit a second measurement report message including measurement information on the detected second cell to the first cell; and when a second configuration message generated according to the second measurement report message is received from the first cell, switch the first cell to a candidate PCell and change the PCell of the first terminal from the first cell to the second cell.

The instructions may further cause the first terminal to: transmit, to the second cell, a downlink reception status message including information on a reception status of downlink data received from the first cell before the changing of the PCell of the first terminal; receive, from the second cell, lost downlink data recovered based on the downlink reception status message; receive, from the second cell, an uplink reception status message including information on a reception status of uplink data transmitted to the first cell before the changing of the PCell of the first terminal; identify whether there is lost uplink data based on the uplink reception status message; and when there is the lost uplink data, recover the lost uplink data and transmit the recovered uplink data to the second cell.

According to the exemplary embodiments of the present disclosure, in the handover procedure, the terminal may maintain a connection with the source cell until being connected to the target cell. After the terminal is connected to the target cell and a handover to the target cell is completed, the terminal may release the connection with the source cell. In addition, in the situation in which the terminal is connected to both the source cell and the target cell, the terminal may operate to perform data communication with one or both of the source cell and the target cell. Through this, while an interruption time in the handover procedure is reduced, the complexity of the terminal and/or the complexity of the handover operation can be reduced.

DETAILED DESCRIPTION OF THE EMBODIMENTS

Figure 1:
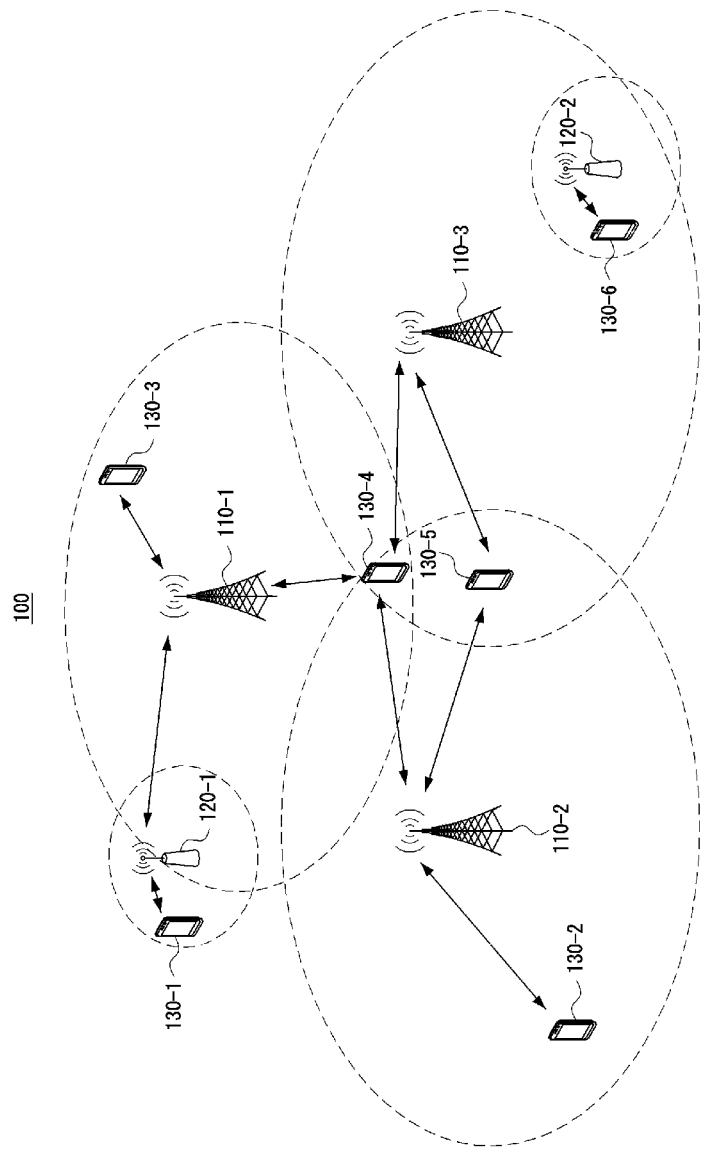
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present specification, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present specification, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
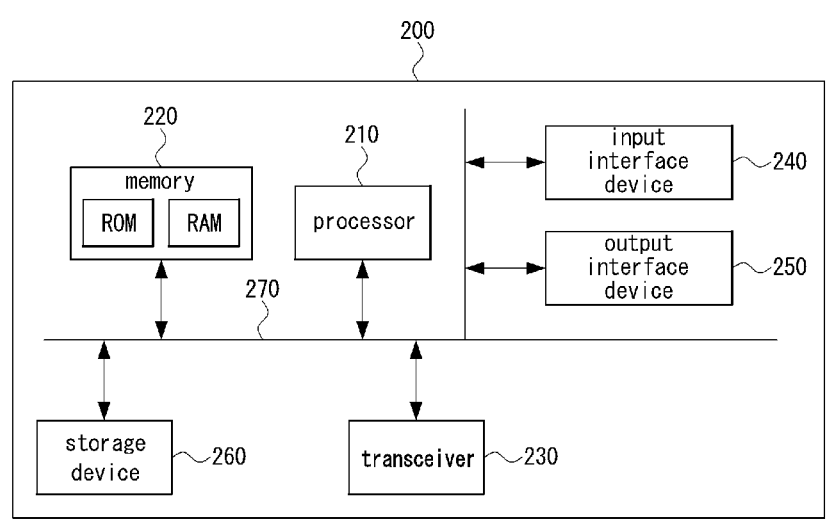
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods and apparatuses for handover in a wireless communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of backhaul links and fronthaul links may be as follows. When a functional-split scheme of the communication protocol is applied, the TRP may selectively perform some functions of the BBU or some functions of a medium access control (MAC) layer or a radio link control (RLC) layer.

FIGS. 3A to 3F are block diagrams illustrating operations and configurations of protocol layers of a terminal in respective steps of a dual active protocol stack (DAPS) handover.

Figure 3A:
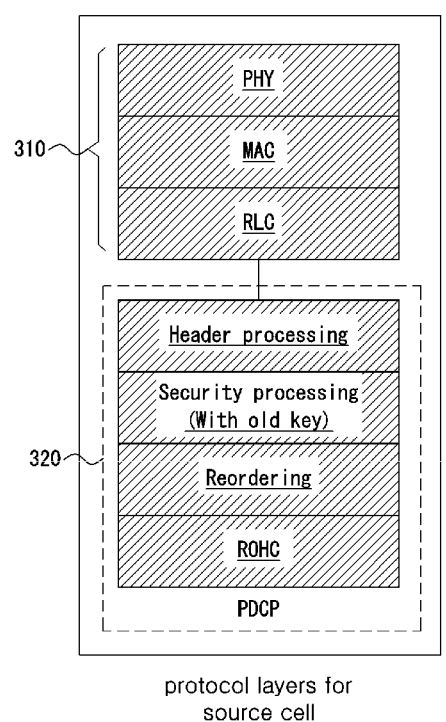
FIGS. 3A to 3F are block diagrams illustrating operations and configurations of protocol layers of a terminal in respective steps of a dual active protocol stack (DAPS) handover.

FIG. 3A shows protocol layers formed in a terminal before a handover is performed. In the terminal, RLC/MAC/PHY layers 310 and a PDCP entity 320 for a source cell are generated and operated.

Figure 3B:
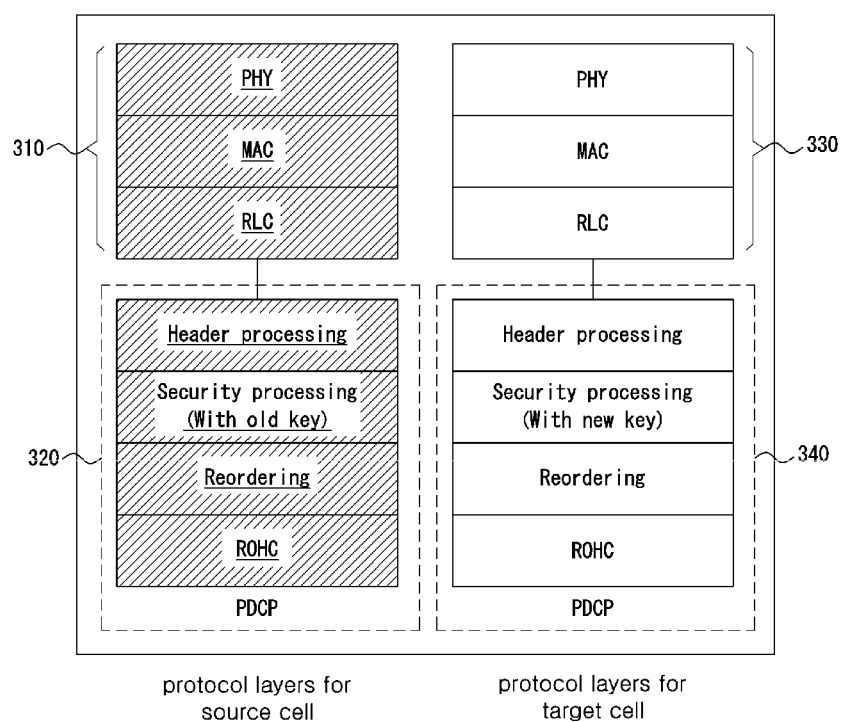

FIG. 3B shows protocol layers of a terminal that has received an RRC connection reconfiguration message from the source cell for performing a handover to a target cell in a DAPS handover. Referring to FIG. 3B, protocol layers for the target cell may be generated in the terminal in addition to the protocol layers 310 and 320 for the source cell. That is, the terminal may configure RLC/MAC/PHY layers 330 for the target cell according to configuration of the target cell, configure a C-RNTI used for the target cell, and configure a DAPS PDCP entity 340 for the target cell.

Figure 3C:
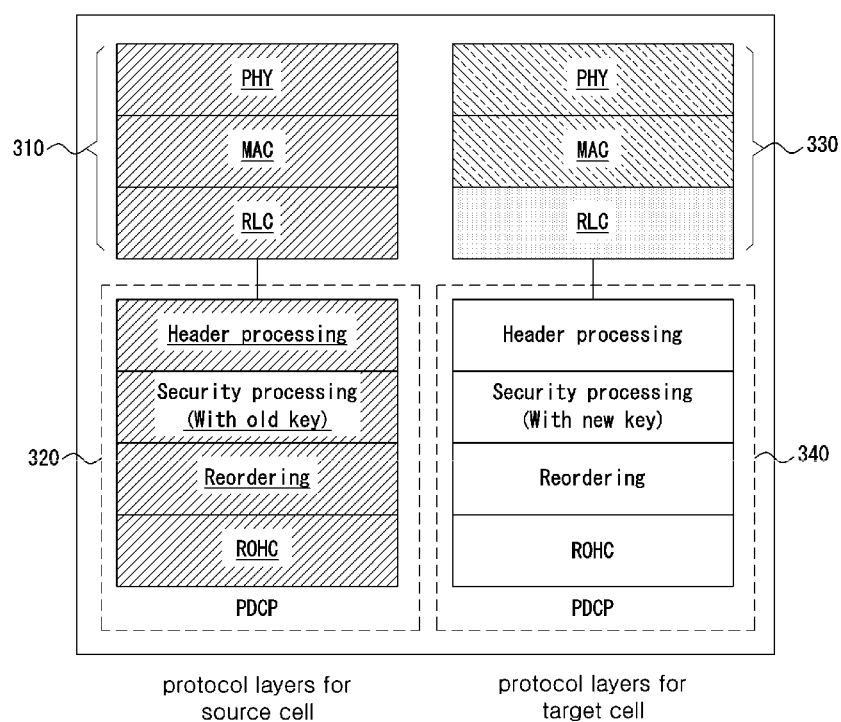

FIG. 3C shows the protocol layers for the source cell and the protocol layers for the target cell when the terminal performs a random access to the target cell.

In the protocol layer state of FIG. 3C, the terminal may attempt a random access to the target cell. The terminal may operate the MAC/PHY layer for the target cell for the random access to the target cell. In addition, when performing contention-based random access, the RLC layer for the target cell may be additionally operated.

Figure 3D:
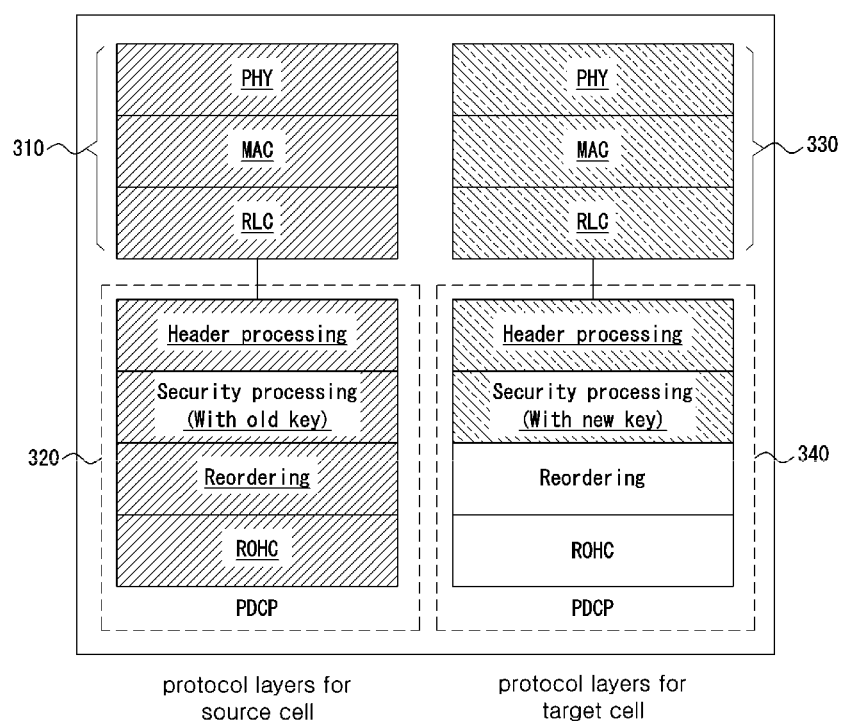
Figure 3E:
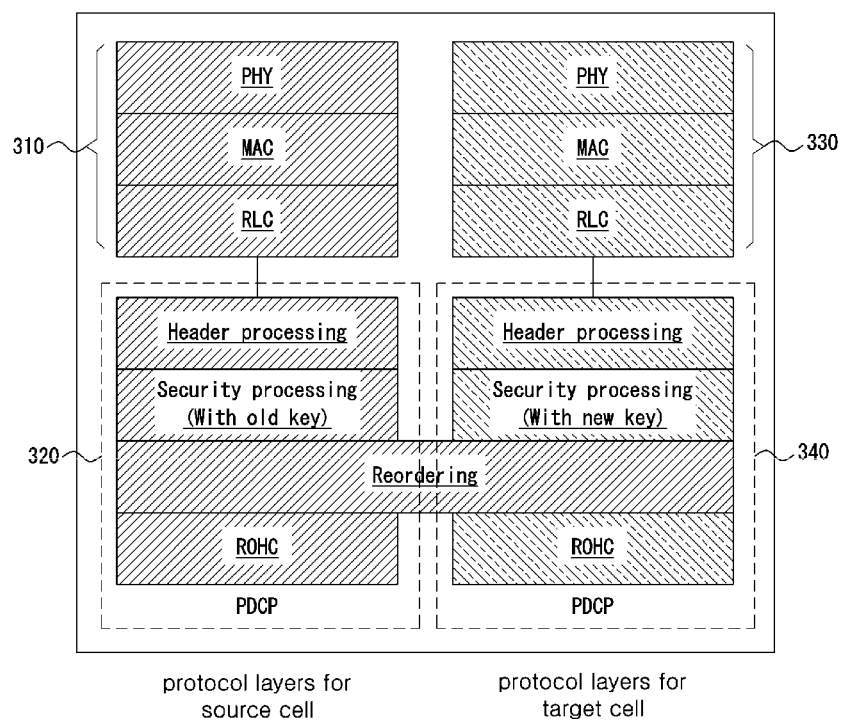

FIG. 3D shows the protocol layers for the source cell and the protocol layers for the target cell when the terminal transmits a handover complete message to the target cell, and FIG. 3E shows the protocol layers for the source cell and the protocol layers for the target cell when the terminal succeeds in the random access. When contention-free random access is performed, FIG. 3E shows the protocol layers for the source cell and the target cell when the terminal receives a random access response from the target cell. On the other hand, when contention-based random access is performed, FIG. 3E shows the protocol layers for the source cell and the target cell when the terminal receives a response to the handover complete message from the target cell.

After the random access to the target cell is successful, the terminal may receive data from each of the source cell and the target cell through downlink. In addition, the terminal may perform uplink data switching to transmit a PDCP data PDU to the target cell and transmit a PDCP control PDU to the source cell or the target cell.

Figure 3F:
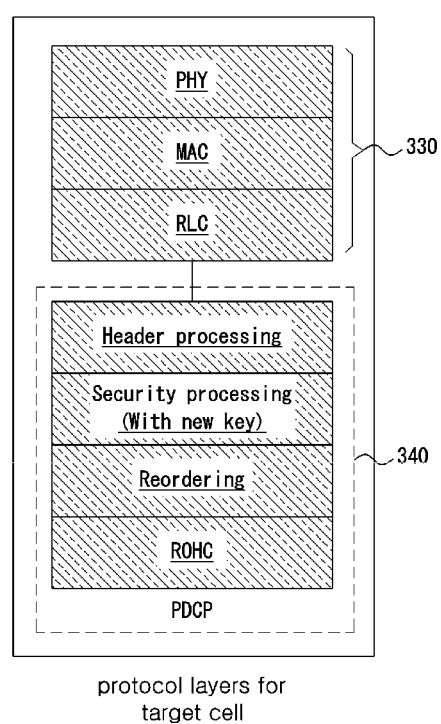

Finally, FIG. 3F shows a state in which only the protocol layers for the target cell exist after the terminal releases the connection to the source cell.

Accordingly, in the DAPS handover, from the time of starting execution of the handover to the target cell to the time of releasing the source cell, the RLC/MAC/PHY layers and the DAPS PDCP entity operates in the terminal for each of the two cells (i.e., source cell, target cell), and thus there may be a problem in that the terminal complexity increases. In particular, the operational complexity of the terminal in the PDCP entity will be described below with reference to FIG. 4.

Figure 4:
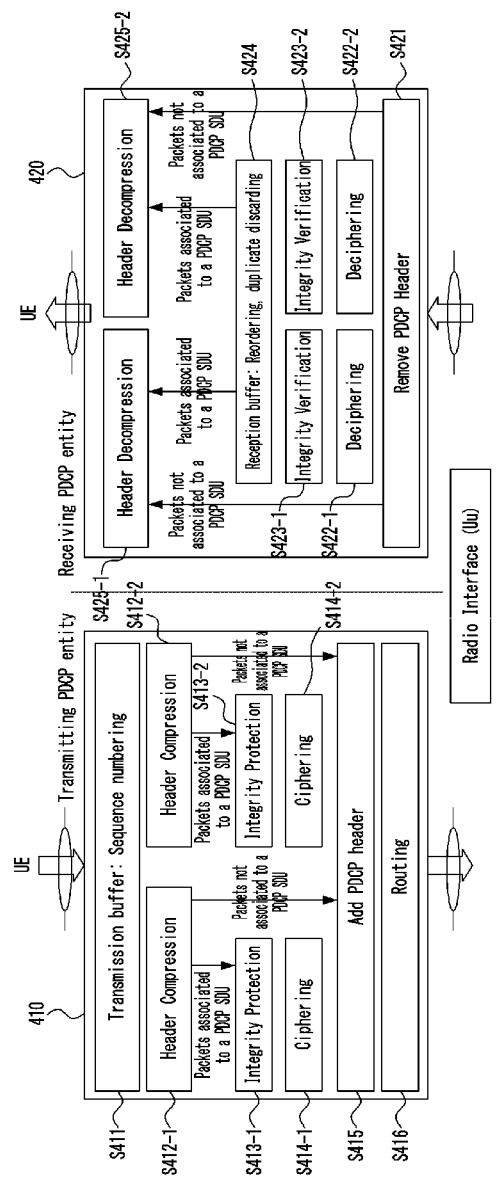
FIG. 4 is a conceptual diagram for describing functions of a DAPS PDCP entity of a terminal in a DAPS handover.

FIG. 4 is a conceptual diagram for describing functions of a DAPS PDCP entity of a terminal in a DAPS handover.

Referring to FIG. 4, a transmitting PDCP layer 410 may store data (i.e., PDCP source data unit (SDU)) received from a higher layer in a transmission buffer, and assign a sequence number to the corresponding PDCP SDU (S411). Thereafter, the transmitting PDCP layer may perform header compression (S412-1 and S412-2), and may optionally perform integrity protection (S413-1 and S413-2) and ciphering (S414-1 and S414-2). Thereafter, the transmitting PDCP layer may add a PDCP header to the data on which the ciphering and integrity protection have been performed (S415), and deliver a PDCP protocol data unit (PDU) to which the PDCP header is added to a lower layer (e.g., RLC layer) for the source cell or target cell through routing (S416). The PDCP PDU delivered to the RLC layer may be delivered to an RLC layer on a receiver side through the MAC layer and PHY layer on the transmitter side and the PHY layer and MAC layer on the receiver side, and the RLC layer on the receiver side may deliver the received PDCP PDU to a receiving PDCP layer 420.

The receiving PDCP layer 420 may perform procedures in the reverse order to those of the transmitting PDCP layer 410. That is, the PDCP header may be removed from the received PDCP PDU (S421), and deciphering (S422-1 and S422-2) and integrity verification (S423-1 and S423-2) may be optionally performed. Reordering may be performed for the data on which the deciphering and integrity verification have been optionally performed, and the reordered data (i.e., PDCP SDU) may be stored in a reception buffer (S424). Finally, header decompression for the PDCP SDU may be performed (S425-1 and S425-2).

That is, in the DAPS handover procedure, since the transmitting and receiving PDCP entity layers of the terminal should perform header compression, integrity protection, ciphering, deciphering, integrity verification, and header decompression for each of the source cell and the target cell, there is a problem in that the complexity of the terminal increases.

Therefore, in the DAPS handover procedure, it is preferable for the terminal to release the source cell as soon as possible in order to reduce processing overhead and complexity due to simultaneous connections with the source cell and the target cell. In addition, in order to reduce a handover interruption time, it is preferable to transmit and receive data by maintaining the connection with the source cell until an appropriate time point.

In the DAPS handover procedure, the terminal may release the source cell in two cases. In one case, when a radio link failure (RLF) occurs due to a poor channel state of the source cell after the terminal succeeds in the random access to the target cell, the terminal may stop data transmission and reception through a link with the source cell, and release the source cell regardless of the base station. Since the terminal continuously monitors a state of the link with the source cell, the link state may be accurately known in real time, so only in this case, the source cell may be released at an optimal time for releasing the source cell. In the other case, the target cell may determine the time of releasing the source cell, and transmit a source cell release configuration message so that the terminal releases the source cell. However, when the target cell determines the time of releasing the source cell, the target cell does not know an optimal time of releasing the source cell because it does not know exactly in real time a data transmission/reception state and a link state between the terminal and the source cell. As described above, if the source cell is released too quickly, the terminal cannot receive data from the source cell. In addition, if the target cell is not in a good enough situation, there may occur a problem in that a handover interruption time increases. Conversely, if the source cell is released too late, the connection to the source cell may be unnecessarily maintained, and thus a processing overhead and complexity may increase due to simultaneous connections with the source cell and the target cell.

Meanwhile, in the DAPS handover method, in order to simultaneously receive and process data from the source cell and the target cell, layers such as RLC/MAC/PHY layers for each of the source cell and the target cell operate, and thus there may be a problem in that the complexity of the terminal and/or the complexity of the handover operation increases.

Figure 5:
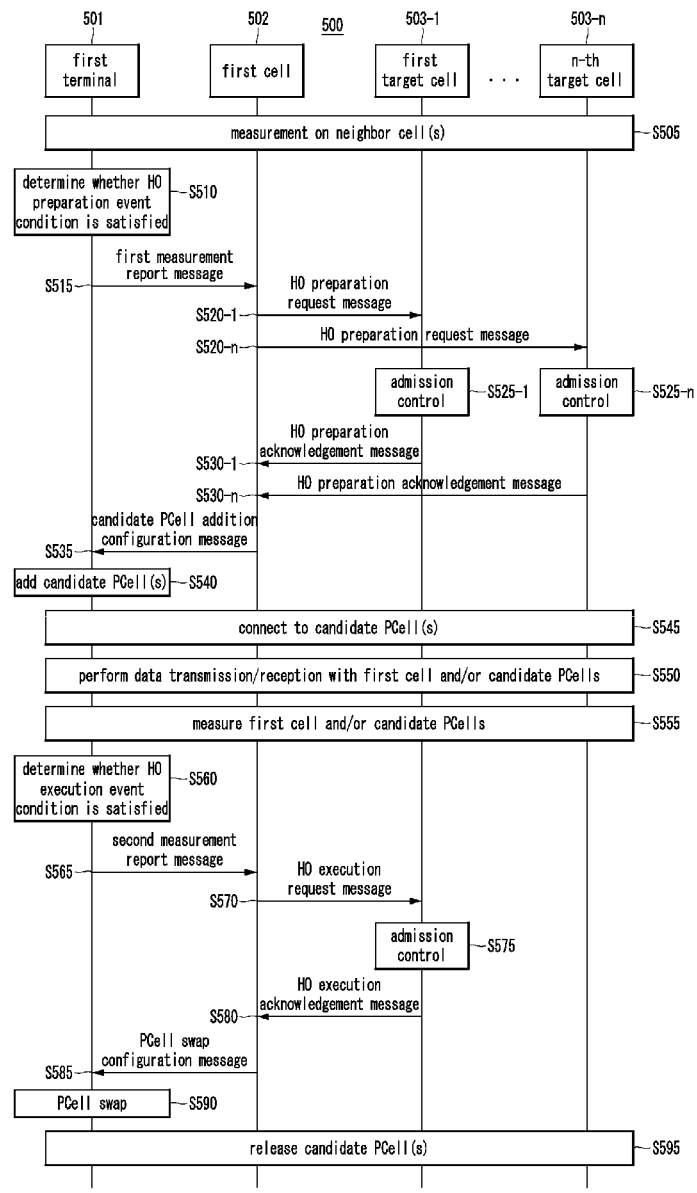
FIG. 5 is a sequence chart illustrating a first exemplary embodiment of a handover method in a communication system.

FIG. 5 is a sequence chart illustrating a first exemplary embodiment of a handover method in a communication system.

Referring to FIG. 5, a handover procedure according to a first exemplary embodiment of a handover method in the communication system is briefly reconfigured mainly based on procedures necessary to describe a handover method of the LTE/NR mobile communication system, and detailed procedures and subsequent procedures are omitted. In addition, the names of messages used in the following description are used according to the intended roles of the corresponding messages, and may be different from the names actually defined in a technical specification.

Referring to FIG. 5, a communication system 500 may include one or more terminals and one or more base stations. The one or more terminals of the communication system 500 may perform communication by being connected to one or more cells formed by the one or more base stations. In an exemplary embodiment of the communication system 500, a first terminal 501 may perform communication by being connected to a first cell 502 among the one or more cells formed by the one or more base stations. The first cell 502 to which the first terminal 501 is connected and with which the first terminal 501 performs communication may correspond to a source cell or a serving cell of the first terminal 501. Alternatively, the first terminal 501 may communicate with the first cell 502 by using the first cell 502 as a primary cell (PCell). Meanwhile, the first terminal 501 may perform a measurement operation on a cell(s) other than the first cell 502, which are included in the communication system 500, and may perform a handover operation accordingly. FIG. 5 shows an exemplary embodiment in which one terminal included in the communication system 500 performs handover between a plurality of cells included in the communication system 500. However, this is only an example for convenience of description and exemplary embodiments of the present disclosure are not limited thereto. For example, the communication system 500 may further include a plurality of terminals in addition to the first terminal, and each of the plurality of terminals may perform a handover operation from one cell to another cell among the plurality of cells included in the communication system 500.

In an exemplary embodiment, the communication system 500 may include a plurality of cells. The communication system 500 may include one or more other cells in addition to the first cell 502 that is the source cell of the first terminal 501. The first terminal 501 may perform measurement on signal strengths of a plurality of cells, which are detectable or within a predetermined communicable range, through a monitoring operation or a measurement operation (S505). For example, the first terminal 501 may perform measurement on signal strengths of the first cell 502 and one or more neighbor cells.

The first terminal 501 may determine whether a measurement result of the step S505 satisfies a predetermined handover (HO) preparation event condition (S510). When the measurement result of the step S505 satisfies the predetermined handover preparation event condition, the first terminal 501 may transmit a first measurement report message based on the measurement result of the step S505 to the first cell 502 (S515). For example, the first measurement report message transmitted by the first terminal 501 to the first cell 502 in the step S515 may include signal measurement results for one or more neighbor cells. However, this is only an example for convenience of description, and exemplary embodiments of the present disclosure are not limited thereto. For example, in another exemplary embodiment, the first terminal 501 may report information on the measurement result of the step S505 to the first cell 502 through the first measurement report message, and the first cell 502 or the target cell receiving the information on the measurement result from the first cell 502 may determine whether the measurement result satisfies the predetermined handover preparation event condition.

The first cell 502 may receive the first measurement report message from the first terminal 501 (S515). Based on the first measurement report message received from the first terminal 501, the first cell 502 may determine one or more target cells 503-1, . . . , and 503-n to which the terminal may perform handover. The first cell 502 may request or indicate handover preparation to the determined one or more target cells 503-1, . . . , and 503-n (S520-1, . . . , and S520-n). For example, the first cell 502 may request or indicate handover preparation by transmitting a HO preparation request message to the one or more target cells 503-1, . . . , and 503-n. Here, the handover preparation request message transmitted by the first cell 502 to the one or more target cells 503-1, . . . , and 503-n may include information on the measurement result for each of the one or more target cells 503-1, . . . , and 503-n, which has been received from the first terminal 501.

Each of the one or more target cells 503-1, . . . , and 503-n may receive the handover preparation request message transmitted from the first cell 502 (S520-1, . . . , and S520-n). The one or more target cells 503-1, . . . , and 503-n may perform an admission control operation based on the received handover preparation request message (S525-1, . . . , and S525-n). The one or more target cells 503-1, . . . , and 503-n may determine whether to approve or accept the handover preparation request from the first cell 502 through the admission control operation in the step S525. In an exemplary embodiment, some or all of the one or more target cells 503-1, . . . , and 503-n may determine to approve the handover preparation request and transmit a HO preparation acknowledgment message to the first cell 502 (S530-1, . . . , and S530-n).

The first cell 502 may receive one or more handover preparation acknowledgment messages transmitted from some or all of the one or more target cells 503-1, . . . , and 503-n (S530-1, . . . , and S530-n). Based on the one or more handover preparation acknowledgment messages received in the step S530, the first cell 502 may transmit, to the first terminal 501, a first configuration message(s) including information for configuring or adding the one or more target cells 503-1, . . . , and 503-n having transmitted the handover preparation acknowledgement messages as candidate PCells. Here, the first configuration message(s) transmitted by the first cell 502 to the first terminal 501 may be singular or plural. For example, the first cell 502 may transmit one or more first configuration messages to the first terminal 501, and each of the one or more first configuration messages may include information for adding one among the one or more target cells 503-1, . . . , and 503-n as a candidate PCell. Alternatively, the first cell 502 may transmit one first configuration message including information for adding the one or more target cells 503-1, . . . , and 503-n as candidate PCells to the first terminal 501. The first configuration message may include information for measuring a signal strength of a target cell to be added as a candidate PCell. The first configuration message may include radio resource configuration information for connection and/or data transmission/reception with a target cell to be added as a candidate PCell. The first configuration message may include configuration information for performing an operation such as synchronization and random access with a target cell to be added as a candidate PCell. The first configuration message may correspond to an RRC reconfiguration message (or, RRCReconfiguration message), or the like. Alternatively, the first configuration message may correspond to a MAC control message transmitted from the first cell 502 to the first terminal 501. The first configuration message may include information of a cell radio network temporary identifier (C-RNTI) of the first terminal 501 for each of the one or more target cells 503-1, . . . , and 503-n. The first configuration message may include information for performing a random access (RA) procedure to each of the one or more target cells 503-1, . . . , and 503-n. The first configuration message may include information on a dedicated preamble for each of the one or more target cells 503-1, . . . , and 503-n. The first configuration message may be referred to as a 'candidate PCell addition configuration message'.

The first terminal 501 may receive the first configuration message from the first cell 502 (S535). Based on the first configuration message received in the step S535, the first terminal 501 may configure or add the one or more target cells 503-1, . . . , and 503-n indicated by the first configuration message as candidate PCells (S540). The first terminal 501 may connect to the one or more added candidate PCells 503-1, . . . , and 503-n (S545). A more detailed configuration related to the operation in which the first terminal 501 adds the one or more candidate PCells 503-1, . . . , and 503-n will be described below with reference to FIG. 6.

The first terminal 501 may perform data communication through the first cell 502 and/or the one or more candidate PCells 503-1, . . . , and 503-n connected according to the steps S540 and/or S545 (S550). The first terminal 501 may perform data communication through only one cell at a time. Alternatively, the first terminal 501 may perform data communication through a plurality of cells at one time. A more detailed configuration related to the operation of the first terminal 501 performing data communication through the first cell 502 and/or the one or more candidate PCells 503-1, . . . , and 503-n will be described below with reference to FIG. 7.

The first terminal 501 may perform measurement on the signal strengths of the first cell 501 and/or the one or more candidate PCells 503-1, . . . , and 503-n through a monitoring operation or a measurement operation (S555). The first terminal 501 may determine whether the measurement result of the step S555 satisfies a predetermined HO execution event condition (S560). For example, the first terminal 501 may determine the HO execution event condition is satisfied when the signal strength of the first cell 502, which is the source cell, is lowered to less than a predetermined reference strength, or when a candidate PCell having a superior signal strength by a preset first offset than that of the first cell 502 exists among the one or more candidate PCells 503-1, . . . , and 503-n.

When the measurement result of the step S555 satisfies the HO execution event condition, the first terminal 501 may transmit a second measurement report message based on the measurement result of the step S555 to the first cell 502 (S565). For example, the second measurement report message transmitted by the first terminal 501 to the first cell 502 in the step S565 may include signal measurement result(s) for the first cell 502 and/or the one or more candidate PCells.

The first cell 502 may receive the second measurement report message transmitted from the first terminal 501 (S565). The first cell 502 may receive the second measurement report message transmitted from the first terminal 501 through the data communication or control signal transmission/reception procedure with the first terminal 501 as in the step S550. Based on the second measurement report message transmitted from the first terminal 501, the first cell 502 may determine one candidate PCell to which the first terminal 501 is to perform handover to among the one or more candidate PCells 503-1, . . . , and 503-n. For example, based on the signal measurement result included in the second measurement report message, the first cell 502 may determine that the first terminal 501 is to perform handover to the first candidate PCell 503-1 among the one or more candidate PCells 503-1, . . . , and 503-n. Based on the signal measurement result included in the second measurement report message, the first cell 502 may determine that the first terminal 501 is to perform handover to the first candidate PCell 503-1 having a superior signal strength by the first offset than that of the first cell 502. Alternatively, in an exemplary embodiment, when the signal strength of the first cell 502 is lowered to less than a predetermined reference strength, the first terminal 501 may determine to perform handover to the first candidate PCell 503-1 having the best signal strength among the one or more of the candidate PCells 503-1, . . . , and 503-n, and may notify this to the first cell 502 through the second measurement report message. Hereinafter, the first candidate PCell 503-1 to which the first terminal 501 is to perform handover may be referred to as a second cell 503-1.

The first cell 502 may request or indicate handover execution to the second cell 503-1 to which the first terminal 501 is to perform handover (S570). For example, the first cell 502 may request or indicate handover execution by transmitting a HO execution request message to the second cell 503-1. Here, the handover execution request message transmitted to the second cell 503-1 may include information on the measurement result of the second cell 503-1 received from the first terminal 501. The second cell 503-1 may receive the handover execution request message transmitted from the first cell 502 (S570). The second cell 503-1 may transmit a HO execution acknowledgment message to the first cell as a response to the received handover execution request message (S580).

The first cell 502 may receive the handover execution acknowledge message from the second cell 503-1 (S580). Based on the handover execution acknowledgement message received from the second cell 503-1, the first cell 502 may transmit a second configuration message including information for allowing the first terminal 501 to perform handover to the second cell 503-1 (S585). The second configuration message may include information for changing the PCell the first terminal 501 from the first cell 502 to the second cell 503-1. The second configuration message may correspond to an RRC reconfiguration message (or, RRCReconfiguration message), or the like. The second configuration message may be referred to as a 'PCell swap configuration message'.

The first terminal 501 may receive the second configuration message from the first cell 502 (S585). The first terminal 501 may perform a PCell swap operation based on the second configuration message received from the first cell 502 (S590). The first terminal 501 may change the PCell from the first cell 502 to the second cell 503-1 based on the second configuration message received from the first cell 502. In this case, the second cell 503-1 may become the PCell of the first terminal 501, and the first cell 502, which was the previous PCell, may become a candidate PCell of the first terminal 501. This may be considered that the first terminal is handed over from the first cell 502 to the second cell 503-1. The second cell 503-1 switched from the candidate PCell to the PCell of the first terminal 501 may also be referred to as a 'new PCell'. A more detailed configuration related to the PCell swap operation according to the step S590 will be described below with reference to FIG. 8.

The first terminal 501 may perform an operation of releasing one or more candidate PCells (S595). The first terminal 501 may receive a third configuration message instructing to release some or all of the one or more candidate PCells from the second cell 503-1 after the PCell swap operation. For example, after the first terminal 501 completes the handover from the first cell 501 to the second cell 503-1, it may not be necessary to additionally maintain connection(s) with one or more candidate PCells. In this case, the second cell 503-1 may instruct the first terminal 501 to release one or more candidate PCells through the third configuration message. The third configuration message may correspond to an RRC reconfiguration message (or, RRCReconfiguration message), or the like. The third configuration message may be referred to as a 'candidate PCell release configuration message'. Alternatively, the first terminal 501 may autonomously determine and perform release of some or all of one or more candidate PCells after the PCell swap operation. If all the candidate PCells are released after the PCell is changed, the first terminal 501 and/or the second cell 503-1 may determine that the handover procedure of the first terminal 501 is completed.

Figure 6:
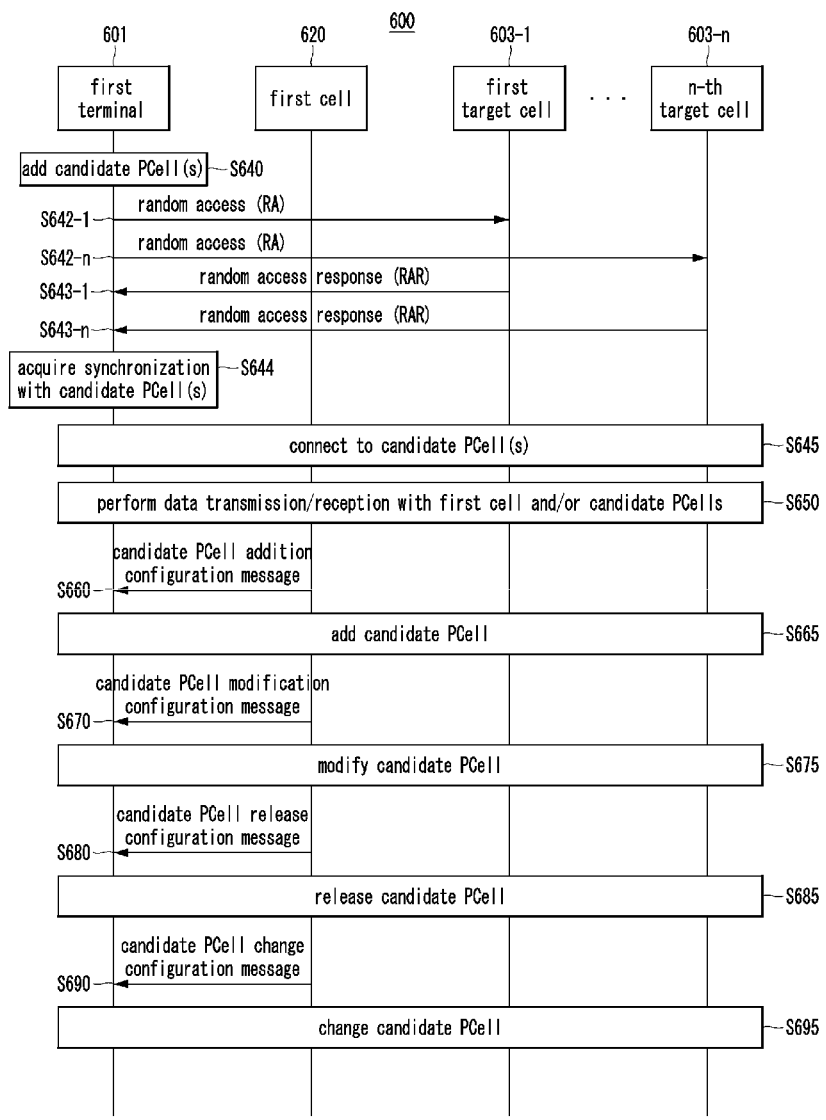
FIG. 6 is a sequence chart illustrating a first exemplary embodiment of a method for adding a candidate primary cell (PCell) in a communication system.

FIG. 6 is a sequence chart illustrating a first exemplary embodiment of a method for adding a candidate primary cell (PCell) in a communication system.

Referring to FIG. 6, a communication system 600 may include one or more terminals and one or more base stations. The one or more terminals of the communication system 600 may perform communication by being connected to one or more cells formed by the one or more base stations. A first terminal 601 included in the communication system 600 may perform a handover operation based on a command or indication from the first cell 602 while being connected to the first cell 602. The first terminal 601 may add one or more cells other than the first cell 602 as candidate PCell(s) based on a command or indication of the first cell 602, and perform a handover operation by changing a PCell from the first cell 602 to one of the added one or more candidate PCells. FIG. 6 shows an exemplary embodiment in which the first cell 601 included in the communication system 600 adds first to n-th target cell 603-1, . . . , and 603-*n* as candidate PCells to perform handover while being connected to a first cell 602. However, this is only an example for convenience of description and exemplary embodiment of the present disclosure are not limited thereto. For example, the communication system 600 may further include a plurality of terminals in addition to the first terminal 601, and each of the plurality of terminal may perform a handover operation from one cell to another cell among the plurality of cells included in the communication system 600. The first terminal 601 described with reference to FIG. 6 may be the same as or similar to the first terminal 501 described with reference to FIG. 5. The first cell 602 described with reference to FIG. 6 may be the same as or similar to the first cell 502 described with reference to FIG. 5. The first to n-th target cells 603-1, . . . , and 603-*n* described with reference to FIG. 6 may be the same as or similar to the first to n-th target cells 503-1, . . . , and 503-*n* described with reference to FIG. 5.

Referring to FIG. 6, the first terminal 601 included in the communication system 600 may receive, from the first cell 602, one or more first configuration messages instructing to add one or more target cells 603-1, . . . , and 603-*n* as candidate PCells while being connected to the first cell 602. Here, the first configuration message may include information for measurement of such as signal strength(s) of the target cell(s) to be added as candidate PCell(s). The first configuration message may include radio resource configuration information for connection and/or data transmission/reception with the target cell(s) to be added as candidate PCell(s). The first configuration message may include configuration information for performing an operation such as synchronization and random access with the target cell(s) to be added as candidate PCell(s). The first configuration message may correspond to an RRC reconfiguration message (or, RRCReconfiguration message), or the like. Alternatively, the first configuration message may correspond to a MAC control message transmitted from the first cell 602 to the first terminal 601. The first configuration message may include information of a C-RNTI of the first terminal 601 for each of the one or more target cells 603-1, . . . , and 603-*n*. The first configuration message may include information for performing a random access (RA) procedure for each of the one or more target cells 603-1, . . . , and 603-*n*. The first configuration message may include information of a dedicated preamble for each of the one or more target cells 603-1, . . . , and 603-*n*. The first configuration message may include MAC/PHY configuration information to be used in each of the one or more target cells 603-1, . . . , and 603-*n*. The first configuration message may be referred to as a 'candidate PCell addition configuration message'.

The first terminal 601 may perform an operation of adding one or more target cells 603-1, . . . , and 603-*n* as candidate PCells based on the one or more first configuration messages (S640). The operation of the first terminal 601 according to the step S640 may be the same as or similar to the operation of the first terminal 501 according to the step S540 described with reference to FIG. 5. The first terminal 601 may be connected to the added one or more candidate PCells 603-1, . . . , and 603-*n* by performing the below operations following the candidate PCell addition operation according to the step S640 or as a part of the candidate PCell addition operation according to the step S640.

The first terminal 601 may perform a random access (RA) procedure(s) to the added one or more candidate PCells 603-1, . . . , and 603-*n*. For example, the first terminal 601 may transmit an RA message to each of the one or more candidate PCells 603-1, . . . , and 603-*n* based on RA-related information included in the first configuration message (S642-1, . . . , and S642-*n*). Each of the one or more candidate PCells 603-1, . . . , and 603-*n* may return a random access response (RAR) message as a response to the RA message from the first terminal 601 (S643-1, . . . , and S643-*n*). However, this is only an example for convenience of description, and the first terminal 601 may perform a various type of RA procedure for each of the one or more candidate PCells 603-1, . . . , and 603-*n*. For example, the first terminal 601 may perform one of various types of RA procedures such as contention-based RA (CBRA), contention-free RA (CFRA), 4-step RA, or 2-step RA procedure. A time when the first terminal 601 performs the RA procedure to each of the one or more candidate PCells 603-1, . . . , and 603-*n* may be indicated by the first cell 602 or determined autonomously by the first terminal 601. For example, the time when the first terminal 601 performs the RA procedure to each of the one or more candidate PCells 603-1, . . . , and 603-n may correspond to a time of adding each of the candidate PCells 603-1, . . . , and 603-n, or a time of accessing each of the candidate PCells 603-1, . . . , and 603-n. Alternatively, the time when the first terminal 601 performs the RA procedure to each of the one or more candidate PCells 603-1, . . . , and 603-n may correspond to a specific time between the time of adding each of the candidate PCells 603-1, . . . , and 603-n and a time of configuring each of the candidate PCells 603-1, . . . , and 603-n.

If the RA procedure is successful, the first terminal 601 may acquire synchronization with each of the one or more candidate PCells 603-1, . . . , and 603-n as a result of the RA procedure (S644). The first terminal 601 may be connected to the one or more candidate PCells 603-1, . . . , and 603-n (S645). In the first terminal 601, MAC/PHY configuration may be completed for the one or more candidate PCells 603-1, . . . , and 603-n based on the first configuration message. The first terminal 601 may transmit a message indicating that MAC/PHY configuration for the one or more candidate PCells 603-1, . . . , and 603-n has been completed to each of the one or more candidate PCells 603-1, . . . , and 603-n. For example, the first terminal 601 may transmit an L2 access complete message indicating that MAC/PHY configuration for the one or more candidate PCells 603-1, . . . , and 603-n has been completed to each of the one or more candidate PCells 603-1, . . . , and 603-n. The L2 access complete message may correspond to a C-RNTI MAC control element or a message defined and used separately. When the first terminal 601 transmits a dedicated preamble to perform the RA procedure, the first terminal 601 may determine the RA procedure is successful when the first terminal 601 normally receives a random access response (RAR) or receives a PDCCH for a C-RNTI. Meanwhile, when the first terminal 601 attempted a contention-based random access (CBRA) procedure, the first terminal 601 may determine that the RA procedure is successful when receiving a PDCCH for a C-RNTI. The first terminal 601 may perform data communication with the first cell 602 and/or the one or more candidate PCells 603-1, . . . , and 603-n connected according to the steps S640 to S645 (S650).

The first cell 602 may generate a fourth configuration message instructing the first terminal 601 to add one or more new cells other than the added one or more candidate PCells 603-1, . . . , and 603-n as candidate PCells, and transmit it to the first terminal 601. For example, the first cell 602 may transmit the fourth configuration message instructing to add a new cell (hereinafter, a third cell) other than the added one or more candidate PCells 603-1, . . . , and 603-n as a candidate PCell to the first terminal 601 (S660). The first terminal 601 may receive the fourth configuration message from the first cell 602 (S660). Based on the received fourth configuration message, the first terminal 601 may perform an operation of adding the third cell indicated by the fourth configuration message as a candidate PCell (S665). The fourth configuration message may be referred to as a 'candidate PCell addition configuration message'.

The first cell 602 may generate a fifth configuration message instructing the first terminal 601 to modify information registered with respect to at least some of the added one or more candidate PCells 603-1, . . . , and 603-n, and transmit it to the first terminal 601. For example, the first cell 602 may transmit a fifth configuration message instructing to modify information registered for one cell (e.g., fourth cell) among the added one or more candidate PCells 603-1, . . . , and 603-n to the first terminal 601 (S670). The first terminal 601 may receive the fifth configuration message from the first cell 602 (S670). Based on the received fifth configuration message, the first terminal 601 may perform an operation of modifying information registered for the fourth cell (S675). The fifth configuration message may be referred to as a 'candidate PCell modification configuration message'.

The first cell 602 may generate a sixth configuration message instructing the first terminal 601 to release some or all of the added one or more candidate PCells 603-1, . . . , and 603-n, and transmit it to the terminal 601. For example, the first cell 602 may transmit a sixth configuration message instructing to release one (e.g., fifth cell) of the added one or more candidate PCells 603-1, . . . , and 603-n to the first terminal 601 (S680). The first terminal 601 may receive the sixth configuration message from the first cell 602 (S680). The first terminal 601 may perform an operation of releasing the fifth cell based on the received sixth configuration message (S685). The sixth configuration message may be referred to as a 'candidate PCell release configuration message'.

The first cell 602 may generate a seventh configuration message instructing the first terminal 601 to change at least some of the added one or more candidate PCells 603-1, . . . , and 603-n to new cell(s) other than the one or more candidate PCells 603-1, . . . , and 603-n, and transmit it to the first terminal 601. For example, the first cell 602 may transmit a seventh configuration message instructing to change one (e.g., sixth cell) among the added one or more candidate PCells 603-1, . . . , and 603-n to a new cell (e.g., seventh cell) other than the one or more candidate PCells 603-1, . . . , and 603-n to the first terminal 601 (S690). The first terminal 601 may receive the seventh configuration message from the first cell 602 (S690). The first terminal 601 may perform an operation of changing the sixth cell among the candidate PCells to the seventh cell based on the received seventh configuration message. For example, the first terminal 601 may perform an operation of releasing the sixth cell and an operation of adding the seventh cell as a candidate PCell (S695). The seventh configuration message may be referred to as a 'candidate PCell change configuration message'.

Figure 7:
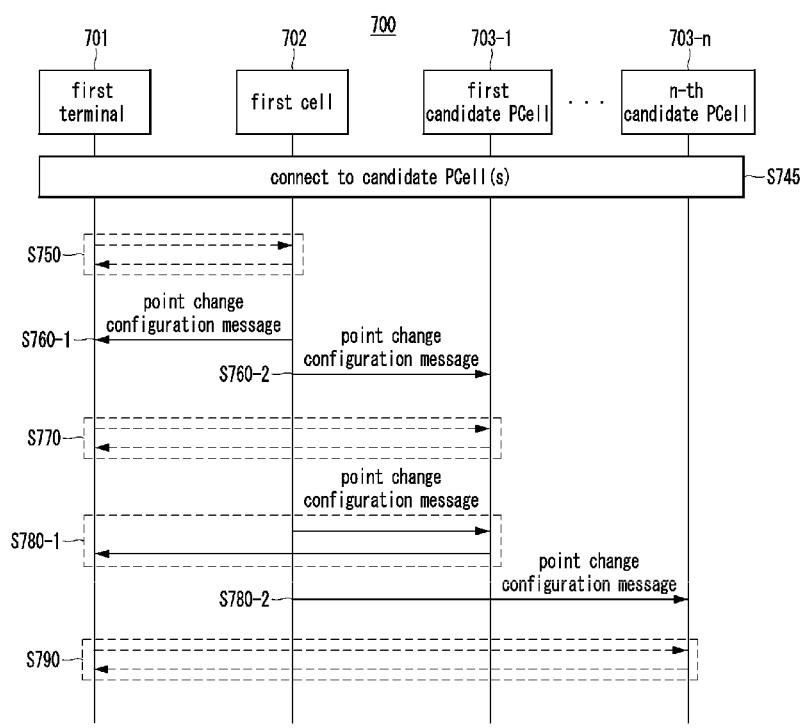
FIG. 7 is a sequence chart illustrating a first exemplary embodiment of a method of performing data communication with a source cell and a candidate PCell in a communication system.

FIG. 7 is a sequence chart illustrating a first exemplary embodiment of a method of performing data communication with a source cell and a candidate PCell in a communication system.

Referring to FIG. 7, a communication system 700 may include one or more terminals and one or more base stations. The one or more terminals of the communication system 700 may perform communication by being connected to one or more cells formed by the one or more base stations. A first terminal 701 included in the communication system 700 may perform a handover operation based on a command or indication from the first cell 702 while being connected to the first cell 702. The first terminal 701 may add one or more cells other than the first cell 702 as candidate PCell(s) based on a command or indication of the first cell 602, and perform the handover operation by changing the PCell of the first terminal 701 from the first cell 702 to one of the added one or more candidate PCells. FIG. 7 shows an exemplary embodiment in which the first terminal 701 included in the communication system 700 performs data communication with first to n-th added candidate PCells 703-1, . . . , and 703-n, which have been added for a handover procedure, and the first cell 702, which is a source cell, while being connected to the first cell 702. However, this is only an example for convenience of description and exemplary embodiment of the present disclosure are not limited thereto. The first terminal 701 described with reference to FIG. 7 may be the same as or similar to the first terminal 501 described with reference to FIG. 5. The first cell 702 described with reference to FIG. 7 may be the same as or similar to the first cell 502 described with reference to FIG. 5. The first to n-th target cells 703-1, . . . , and 703-n described with reference to FIG. 7 may be the same as or similar to the first to n-th target cells 503-1, . . . , and 503-n described with reference to FIG. 5.

The first terminal 701 may add one or more cells 703-1, . . . , and 703-n among neighbor cells as candidate PCell(s) based on a command or indication of the first cell 702. The first terminal 701 may be connected to the one or more added first to n-th candidate PCells 703-1, . . . , and 703-n (S745). The access operation according to the step S745 may be, for example, the same as or similar to the access operation described with reference to FIG. 5. The first terminal 701 may perform data communication with the one or more candidate PCells 703-1, . . . , and 703-n and/or the first cell 702. The first terminal 701 may perform data communication through only one cell at a time. Alternatively, the first terminal 701 may perform data communication through a plurality of cells at one time. The first terminal 701 may perform data communication with each of the first cell 702 and the candidate PCells according to PHY layer configuration for each candidate PCell.

The first terminal 701 may perform data communication with the first cell 702, which is a source cell (S750). The first cell 702 may transmit a point change configuration message instructing to switch a data transmission and reception point for the first terminal 701 from the first cell 702 to one of the one or more candidate PCells 703-1, . . . , and 703-n to the first terminal 701 to control the first terminal 701 to change the data transmission and reception point.

For example, the first cell 702 may transmit a first point change configuration message instructing to switch the data transmission and reception point of the first terminal 701 from the first cell 702 to a first candidate PCell 703-1 among the one or more candidate PCells 703-1, . . . , and 703-n to the first terminal 701 (S760-1). The first cell 702 may transmit a second point change configuration message indicating that the data transmission and reception point of the first terminal 701 is switched from the first cell 702 to the first candidate PCell 703-1 to the first candidate PCell 703-1. Based on the first point change configuration message, the first terminal 701 may change the connection with the first cell 702 to an inactive state, and change the connection with the first candidate PCell 703-1 to an active state. The first terminal 701 and the first candidate PCell 703-1 may perform data communication with each other based on the first and second point change configuration messages transmitted from the first cell 702 (S770).

Meanwhile, the first cell 702 may transmit a third point change configuration message for instructing to switch the data transmission and reception point of the first terminal 701 from the first candidate PCell 703-1 to the n-th candidate PCell 703-n to the first terminal 701 through the first candidate PCell 703-1 (S780-1). The first cell 702 may transmit a fourth point change configuration message indicating that the data transmission and reception point of the first terminal 701 is switched from the first candidate PCell 703-1 to the n-th candidate PCell 703-n to the n-th candidate PCell 703-n. Based on the third point change configuration message, the first terminal 701 may change the connection with the first candidate PCell 703-1 to an inactive state, and change the connection with the n-th candidate PCell 703-n to an active state. The first terminal 701 and the n-th candidate PCell 703-n may perform data communication with each other based on the third and fourth point change configuration messages transmitted from the first cell 702 (S790).

The first terminal 701, the first cell 702, and/or the one or more candidate PCells 703-1, . . . , and 703-n may exchange data reception status information with each other after the point change, so that a data transmission/reception loss which may occur in the procedure for the point change can be quickly recovered. The first terminal 701, the first cell 702, and/or the one or more candidate PCells 703-1, . . . , and 703-n may recover or retransmit the lost data based on the data reception status information exchanged with each other. After the point is changed, the first terminal 701 may reconfigure a MAC hybrid automatic repeat and request (HARQ) state with or without maintaining the MAC HARQ state according to configuration by a base station forming each cell. Different data recovery methods may be used for a case where the first terminal 701 maintains the MAC HARQ state and a case where the first terminal 701 does not maintain the MAC HARQ state.

For example, when the MAC HARQ state is not maintained after the data transmission and reception point of the first terminal 701 is changed from the first cell 702 to the first candidate PCell 703-1, the first terminal 701 may transmit a message including downlink data reception status information to the first cell 702 through the first candidate PCell 703-1, so that the corresponding data can be quickly retransmitted to the first terminal 701 through the first candidate PCell 703-1. In an exemplary embodiment, the downlink data reception status information may correspond to an RLC status PDU. However, this is only an example for convenience of description, and exemplary embodiments of the present disclosure are not limited thereto. For example, in another exemplary embodiment, the downlink data reception status information may correspond to an RLC status report. On the other hand, the first cell 702 may transmit a message including uplink data reception status information to the first terminal 701 through the first candidate PCell 703-1, so that the corresponding data can be quickly retransmitted from the first terminal 701 to the first candidate PCell 703-1.

On the other hand, when the MAC HARQ state is maintained after the data transmission and reception point of the first terminal 701 is changed from the first cell 702 to the first candidate PCell 703-1, a data transmission/reception loss may be quickly recovered through a HARQ retransmission procedure. To this end, uplink HARQ state information and an uplink HARQ buffer for the first cell 702 before the point change may be duplicated or delivered to the first candidate PCell 703-1 after the point change. On the other hand, the first cell 702 may maintain the HARQ state by delivering downlink HARQ state information and a DL HARQ buffer for the first terminal 701 before the point change to the first candidate PCell 703-1 after the point change. Accordingly, a data transmission/reception loss may be quickly recovered through HARQ retransmission.

Figure 8:
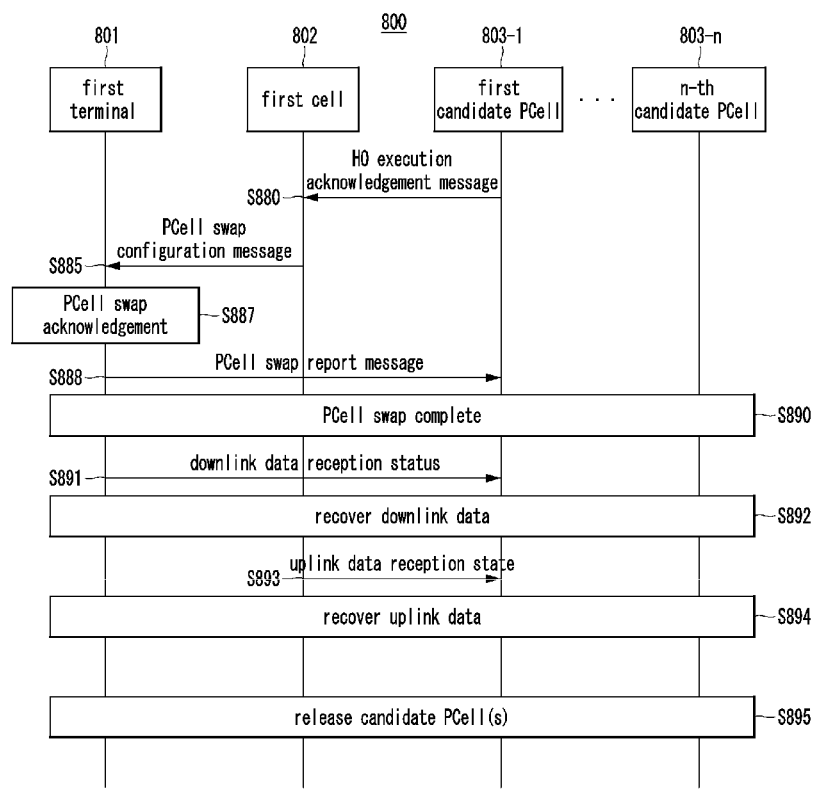
FIG. 8 is a sequence chart illustrating a first exemplary embodiment of a PCell swap method in a communication system.

FIG. 8 is a sequence chart illustrating a first exemplary embodiment of a PCell swap method in a communication system.

Referring to FIG. 8, a communication system 800 may include one or more terminals and one or more base stations. The one or more terminals of the communication system 800 may perform communication by being connected to one or more cells formed by the one or more base stations. A first terminal 801 included in the communication system 800 may perform a handover operation based on a command or indication from a first cell 802 while being connected to the first cell 802. The first terminal 801 may add one or more cells other than the first cell 802 as candidate PCell(s) based on a command or indication of the first cell 802, and perform the handover operation by changing the PCell of the first terminal 801 from the first cell 802 to one of the added one or more candidate PCells. FIG. 8 shows an exemplary embodiment in which the first terminal 801 included in the communication system 800 changes the PCell from the first cell 802 to one candidate PCell among one or more candidate PCells. However, this is only an example for convenience of description and exemplary embodiment of the present disclosure are not limited thereto. The first terminal 801 described with reference to FIG. 8 may be the same as or similar to the first terminal 501 described with reference to FIG. 5. The first cell 802 described with reference to FIG. 8 may be the same as or similar to the first cell 502 described with reference to FIG. 5. The first to n-th target cells 803-1, . . . , and 803-n described with reference to FIG. 8 may be the same as or similar to the first to n-th target cells 503-1, . . . , and 503-n described with reference to FIG. 5. Hereinafter, in describing a first exemplary embodiment of a PCell swap method with reference to FIG. 8, the content described with reference to FIG. 5 may be omitted.

The first cell 802 may receive, from the first candidate PCell 803-1 (hereinafter, referred to as the second cell) to which the first terminal 801 is to be handed over, a HO execution acknowledgement message as a response to the HO execution request message transmitted by the first terminal 801 to the second cell 803-1 (S880). The first cell 802 may transmit a second configuration message including information for allowing the first terminal 801 to be handed over to the second cell 803-1 to the first terminal 810 based on the handover execution acknowledgement message received from the second cell 803-1 (S885). The second configuration message may include configuration information for allowing the first terminal 801 to complete the handover to the second cell 803-1. For example, the second configuration message may include configuration information for an L3 handover of the first terminal. The second configuration message may include information on a bearer to be applied to the second cell 803-1. The second configuration message may include changed MAC/PHY configuration information to be used by the second cell 803-1. The second configuration message may include configuration information indicating a PCell swap operation of the first terminal 801. The configuration information indicating the PCell swap operation of the first terminal 801 may refer to configuration information for the first terminal 801 to change the PCell from the first cell 802 to the second cell 803-1. The configuration information indicating the PCell swap operation of the first terminal 801 may be generated by the first cell 802 and included in the second configuration message. Alternatively, the configuration information indicating the PCell swap operation of the first terminal 801 may be generated by the second cell 803-1 and transmitted to the first cell 802, thereby being included in the second configuration message. The configuration information for allowing the first terminal 801 to change the PCell from the first cell 802 to the second cell 803-1 may include configuration information for the L3 handover of the first terminal 801. The second configuration message may correspond to an RRC reconfiguration message (or, RRCReconfiguration message), or the like. Alternatively, the second configuration message may correspond to a MAC control message transmitted from the first cell 802 to the first terminal 801. The second configuration message may be referred to as a 'PCell swap configuration message'.

The first terminal 801 may receive the second configuration message from the first cell 802 (S885). The first terminal 801 may receive the second configuration message from the first cell 802 through a cell with which the first terminal 801 is connected and with which the first terminal 801 performs data communication. The first terminal 801 may identify the configuration information included in the second configuration message (S887). For example, the first terminal 801 may identify the configuration information indicating the PCell swap operation, which is included in the second configuration message. Based on the second configuration message, the first terminal 801 may change the PCell of the first terminal 801 from the first cell 802 to the second cell 803-1, and may transmit a predetermined report message reporting this to the second cell 803-1 (S888). The report message transmitted in the step S888 may include information indicating that the PCell of the first terminal 801 has been changed from the first cell 802 to the second cell 803-1. The report message transmitted in the step S888 may include information indicating that the first terminal 801 has completed the L3 handover. Through this, the PCell swap procedure of the first terminal 801 may be completed (S890).

In another exemplary embodiment, the second configuration message according to the step S885 may be transmitted as being included in a message identical or similar to the first configuration message in the step S535 described with reference to FIG. 5. Here, when the handover execution event condition of the step S560 is satisfied, the first terminal 801 may perform the PCell swap operation according to the previously received second configuration message and transmit the PCell swap report message.

When the PCell swap has been performed, data may be transmitted according to new bearer information, and it may be needed to separately process data transmitted through a previous bearer before the PCell swap and data transmitted through a bearer after the PCell swap. In an exemplary embodiment, the first terminal 801 and the second cell 803-1 may use different logical channels before and after the PCell swap to separately process the bearer before the PCell swap and the bearer after the PCell swap. In another exemplary embodiment, after all the data have been transmitted through the bearer before the PCell swap, the first terminal 801 and the second cell 803-1 may notify that the last data has been transmitted through the corresponding bearer by transmitting an end marker through the corresponding bearer. In yet another exemplary embodiment, after all the data have been transmitted through the previous bearer before the PCell swap, the first terminal 801 and the second cell 803-1 may notify that first data is transmitted through the new bearer by transmitting a start marker through the new bearer before the data is transmitted through the new bearer.

If the first terminal 801 was performing data communication with the first cell 802 before the PCell swap, after the PCell swap procedure, the first terminal 801, the first cell 802, and the second cell 803 may identify whether there is data that has not been completely transmitted and was lost in the data communication between the first terminal 801 and the first cell 802 before the PCell swap. On the other hand, if the data transmission and reception point of the first terminal 801 was the second cell 803-1 before the PCell swap procedure, it may not be necessary to additionally identify the existence of lost data.

If the first terminal 801 was performing data communication with the first cell 802 before the PCell swap, the first terminal may transmit a message including information on a reception status of downlink data received from the first cell 802 before the PCell swap (hereinafter, 'downlink data reception status') to the second cell 803-1 (S891). The second cell 803-1 may receive the message including the information on the downlink data reception status from the first terminal 801 (S891). The first cell 802 may receive the information on the downlink data reception status from the second cell 803-1, and may determine whether the downlink data transmitted to the first terminal 801 before the PCell swap has been transmitted without loss. If there is no lost downlink data, a separate data recovery operation may not be required. On the other hand, if there is lost downlink data, the first cell 802 may recover the lost downlink data and transmit it to the second cell 803-1. The second cell 803-1 may transmit the recovered downlink data delivered from the first cell 802 to the first terminal 801. Accordingly, some lost data of the downlink data received by the first terminal 801 from the first cell 802 before the PCell swap may be recovered (S892).

On the other hand, if the first terminal 801 was performing data communication with the first cell 802 before the PCell swap, the first cell 802 may transmit a message including information on a reception status of uplink data received from the first terminal 801 before the PCell swap (hereinafter, 'uplink data reception status') to the second cell 803-1 (S893). The second cell 803-1 may receive the message including the information on the uplink data reception status from the first cell 802 (S893). The first terminal 801 may receive the information on the uplink data reception status from the second cell 803-1, and may determine whether the uplink data transmitted to the first cell 802 before the PCell swap has been transmitted without loss. If there is no lost uplink data, a separate data recovery operation may not be required. On the other hand, if there is lost uplink data, the first terminal 801 may recover the lost uplink data and transmit it to the second cell 803-1. The second cell 803-1 may transmit the recovered uplink data delivered from the first terminal 801 to the first cell 802. Accordingly, some lost data of the uplink data received by the first cell 802 from the first terminal 801 before the PCell swap may be recovered (S894).

The first terminal 801 may perform an operation of releasing one or more candidate PCells (S895). The first terminal 801 may perform a candidate PCell release operation by receiving a third configuration message instructing to release some or all of one or more candidate PCells from the second cell 803-1 after the PCell swap operation. Alternatively, the first terminal 501 may autonomously determine and perform release of some or all of one or more candidate PCells after the PCell swap operation. If all the candidate PCells are released after the PCell is changed, the first terminal 801 and/or the second cell 803-1 may determine that the handover procedure of the first terminal 801 has ended.

According to the exemplary embodiments of the present disclosure, in the handover procedure, the terminal may maintain a connection with the source cell until being connected to the target cell. After the terminal is connected to the target cell and a handover to the target cell is completed, the terminal may release the connection with the source cell. In addition, in the situation in which the terminal is connected to both the source cell and the target cell, the terminal may operate to perform data communication with one or both of the source cell and the target cell. Through this, while an interruption time in the handover procedure is reduced, the complexity of the terminal and/or the complexity of the handover operation can be reduced.

However, the effects that can be achieved by the method and apparatus for handover in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A handover method of a first terminal in a wireless communication system, the handover method comprising:
    transmitting a first measurement report message to a first cell that is a primary cell (PCell);
    receiving, from the first cell, one or more first configuration messages for one or more target cells determined according to the first measurement report message;
    adding each of the one or more target cells as a candidate PCell based on the one or more first configuration messages;
    performing data transmission and reception with at least one cell among the first cell and the one or more candidate PCells;
    changing a PCell of the first terminal from the first cell to a second cell determined as a handover target among the one or more candidate PCells;
    performing a first process for signaling of reception status information for data transmission between the first terminal and the first cell before the changing of the PCell of the first terminal; and
    when it is identified that there is lost data based on the reception status information, performing a second process for transmission and reception of recovered data corresponding to the lost data.

2. The handover method according to claim 1, wherein the changing of the PCell comprises:
    switching the first cell to a candidate PCell; and
    changing a PCell of the first terminal from the first cell to the second cell.

3. The handover method according to claim 1, wherein the changing of the PCell comprises:
   monitoring whether a handover execution event condition is satisfied for the one or more candidate PCells;
   when the second cell satisfying the handover execution event condition is detected among the one or more candidate PCells, transmitting a second measurement report message including measurement information on the detected second cell to the first cell; and
   when a second configuration message generated according to the second measurement report message is received from the first cell, switching the first cell to a candidate PCell and changing the PCell of the first terminal from the first cell to the second cell.

4. The handover method according to claim 1, wherein the performing of the first process comprises:
   transmitting, to the second cell, a downlink reception status message including the reception status information on a reception status of downlink data received from the first cell before the changing of the PCell of the first terminal; and
   wherein the performing of the second process comprises:
   when the lost data is lost downlink data, receiving, from the second cell, the lost downlink data which is recovered by the second cell based on the downlink reception status message.

5. The handover method according to claim 1, wherein the performing of the first process comprises:
   receiving, from the second cell, an uplink reception status message including information on a reception status of uplink data transmitted to the first cell before the changing of the PCell of the first terminal; and
   identifying whether there is lost uplink data based on the uplink reception status message; and
   wherein the performing of the second process comprises:
   when the lost data is the lost uplink data, recovering, by the first terminal, the lost uplink data and transmitting the lost uplink data which is recovered to the second cell.

6. The handover method according to claim 1, further comprising, after the adding of each of the one or more target cells,
   receiving, from the first cell, an additional configuration message indicating information instructing to change candidate PCell-related configuration; and
   changing the candidate PCell-related configuration based on the additional configuration message,
   wherein the additional configuration message corresponds to one of a third configuration message instructing to release at least part of the one or more candidate PCells, a fourth configuration message instructing the first terminal to add a new cell other than the one or more candidate PCells as a candidate PCell, a fifth configuration message instructing to modify information registered with respect to one cell among the one or more candidate PCells, and a sixth configuration message instructing to change one cell among the one or more candidate PCells to a new cell other than the one or more candidate PCells.

7. The handover method according to claim 1, wherein the one or more first configuration messages include at least part of radio resource configuration information for performing connection and/or data transmission/reception with the one or more target cells, configuration information for performing synchronization and/or random access (RA) for the one or more target cells, and configuration information for performing signal strength measurement for the one or more target cells.

8. The handover method according to claim 1, further comprising, after the adding of each of the one or more target cells,
   performing an RA procedure for the one or more candidate PCells; and
   acquiring synchronization with the one or more candidate PCells based on the RA procedure,
   wherein a time of performing the RA procedure is indicated by the first cell or determined by the first terminal.

9. A handover control method of a first cell in a wireless communication system, the handover control method comprising:
   receiving a first measurement report message from a first terminal connected to the first cell;
   transmitting a handover preparation request message to each of one or more target cells identified based on the first measurement report message;
   receiving a handover preparation acknowledgment message that is a response to the handover preparation request message from at least part of the one or more target cells;
   transmitting, to the first terminal, one or more first configuration messages instructing to add each of one or more target cells transmitting the handover preparation acknowledgment message as a candidate primary cell (PCell); and
   performing a first process for transmitting point change configuration messages to the first terminal and a seventh cell among the added one or more candidate PCells,
   wherein the point change configuration messages indicate a change of a data transmission and reception point of the first terminal from the first cell to the seventh cell.

10. The handover control method according to claim 9, further comprising, after the transmitting of the one or more first configuration messages, transmitting, to the first terminal, a second configuration message instructing to change a PCell of the first terminal from the first cell to a second cell determined as a handover target among the one or more candidate PCells.

11. The handover control method according to claim 10, wherein the transmitting of the second configuration message comprises:
   receiving, from the first terminal, a second measurement report message including measurement information on the second cell satisfying a predetermined handover execution event condition among the one or more candidate PCells added based on the one or more first configuration messages;
   transmitting a handover execution request message to the second cell based on the second measurement report message;
   receiving a handover execution acknowledgement message as a response to the handover execution request message from the second cell; and
   transmitting, to the first terminal, a second configuration message instructing to change the PCell of the first terminal from the first cell to the second cell.

12. The handover control method according to claim 9, further comprising, after the transmitting of the one or more first configuration messages, transmitting, to the first terminal, an additional configuration message indicating information instructing to change candidate PCell-related configuration,
wherein the additional configuration message corresponds to one of a third configuration message instructing to release at least part of the one or more candidate PCells, a fourth configuration message instructing the first terminal to add a new cell other than the one or more candidate PCells as a candidate PCell, a fifth configuration message instructing to modify information registered with respect to one cell among the one or more candidate PCells, and a sixth configuration message instructing to change one cell among the one or more candidate PCells to a new cell other than the one or more candidate PCells.

13. The handover control method according to claim 9, wherein the one or more first configuration messages include at least part of radio resource configuration information for the first terminal to perform connection and/or data transmission/reception with the one or more target cells, configuration information for the first terminal to perform synchronization and/or random access (RA) for the one or more target cells, and configuration information for the first terminal to perform signal strength measurement for the one or more target cells.

14. The handover control method according to claim 9, wherein the point change configuration messages include at least a seventh configuration message and an eight configuration message, and the performing of the first process comprises,
performing data transmission and reception with the first terminal;
transmitting, to the first terminal, the seventh configuration message instructing to change the data transmission and reception point to a seventh cell among the added one or more candidate PCells; and
transmitting, to the seventh cell, the eighth configuration message indicating that the data transmission and reception point of the first terminal is changed from the first cell to the seventh cell.

15. A first terminal performing inter-cell handover in a wireless communication system, the first terminal comprising:
a processor;
a memory electronically communicating with the processor; and
instructions stored in the memory,
wherein when executed by the processor, the instructions cause the first terminal to:
transmit a first measurement report message to a first cell that is a primary cell (PCell);
receive, from the first cell, one or more first configuration messages for one or more target cells determined according to the first measurement report message;
add each of the one or more target cells as a candidate PCell based on the one or more first configuration messages;
perform data transmission and reception with at least one cell among the first cell and the one or more candidate PCells;
switch the first cell to a candidate PCell, and change a PCell of the first terminal from the first cell to a second cell determined as a handover target among the one or more candidate PCells,
perform a first process for signaling of reception status information for data transmission between the first terminal and the first cell before the changing of the PCell of the first terminal; and
when it is identified that there is lost data based on the reception status information, perform a second process for transmission and reception of recovered data corresponding to the lost data.

16. The first terminal according to claim 1, wherein the instructions further cause the first terminal to:
monitor whether a handover execution event condition is satisfied for the one or more candidate PCells;
when the second cell satisfying the handover execution event condition is detected among the one or more candidate PCells, transmit a second measurement report message including measurement information on the detected second cell to the first cell; and
when a second configuration message generated according to the second measurement report message is received from the first cell, switch the first cell to a candidate PCell and change the PCell of the first terminal from the first cell to the second cell.

17. The first terminal according to claim 15, wherein the instructions further cause the first terminal to:
transmit, to the second cell, a downlink reception status message including information on a reception status of downlink data received from the first cell before the changing of the PCell of the first terminal;
when the lost data is lost downlink data, receive, from the second cell, the lost downlink data recovered by the second cell based on the downlink reception status message;
receive, from the second cell, an uplink reception status message including information on a reception status of uplink data transmitted to the first cell before the changing of the PCell of the first terminal;
identify whether there is lost uplink data based on the uplink reception status message; and
when there is the lost uplink data, recover the lost uplink data and transmit the lost uplink data which is recovered to the second cell.

* * * * *